April 4, 1950   H. T. MITCHELL ET AL   2,502,662
RADIO BEACON SYSTEM
Filed July 2, 1947   6 Sheets-Sheet 1
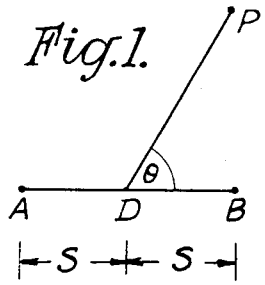
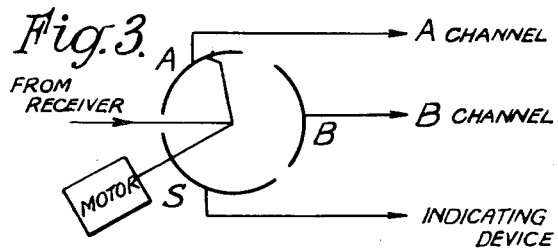
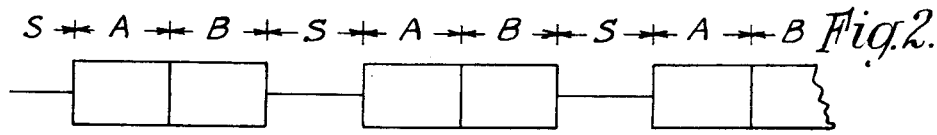
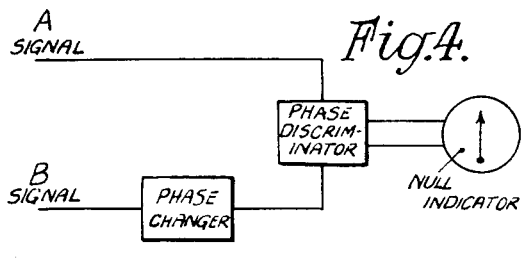
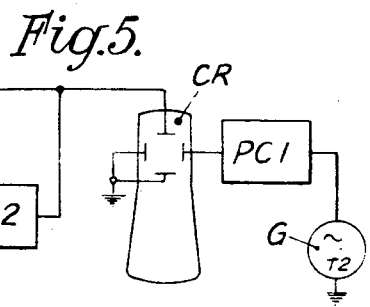
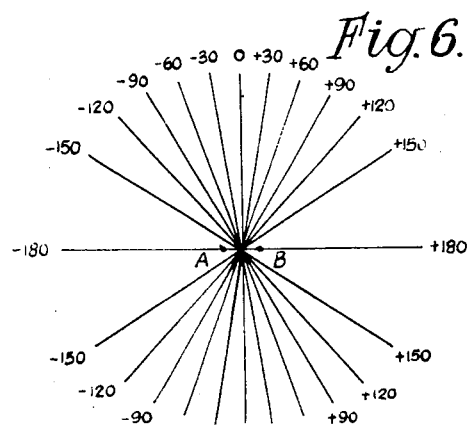
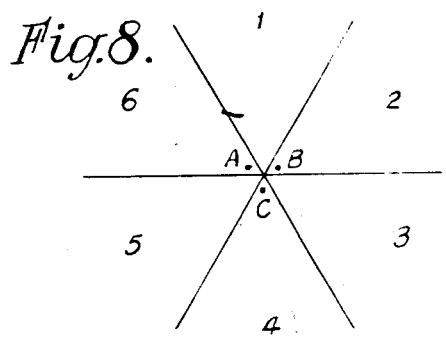
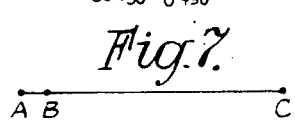
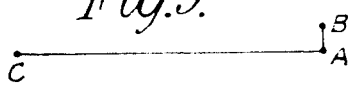
INVENTORS-
Henry Thomas Mitchell and
Thomas Kilvington —
BY
THEIR AGENT

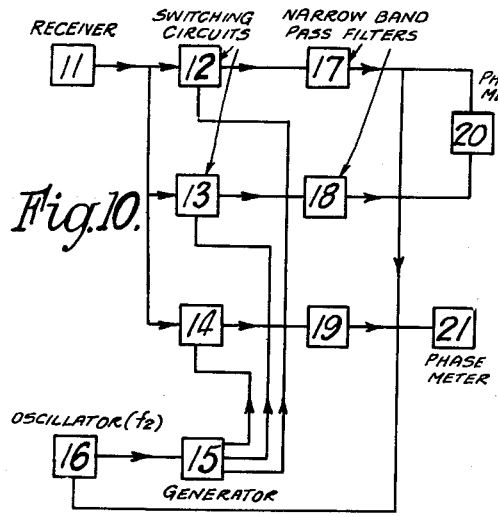
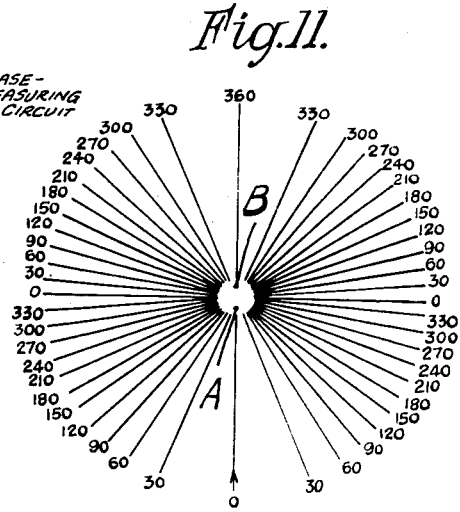
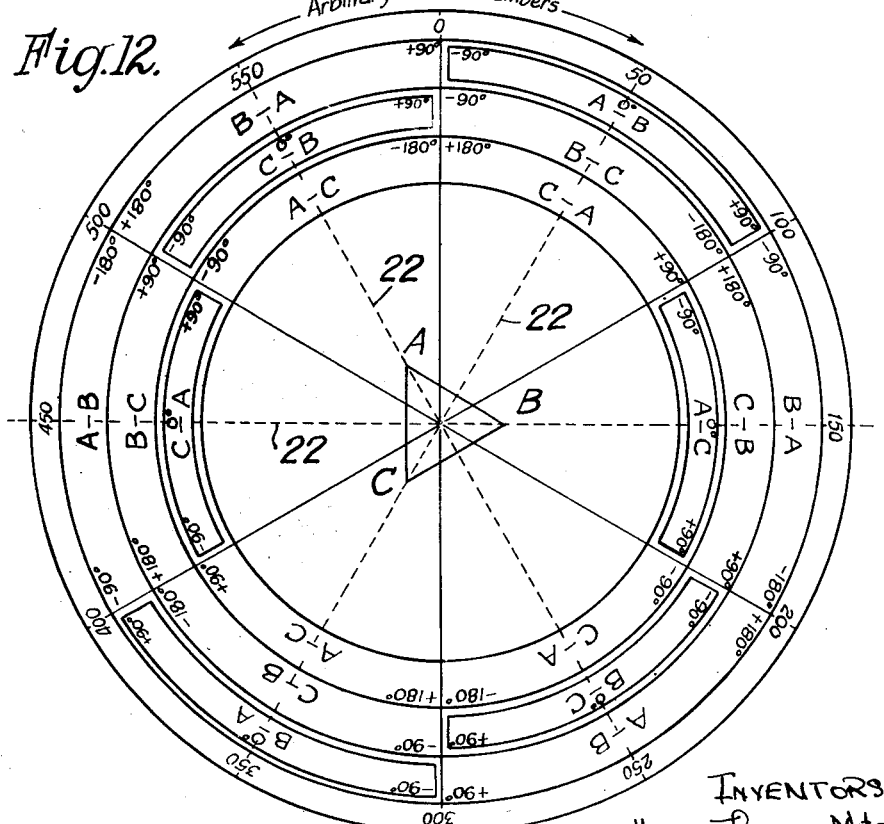

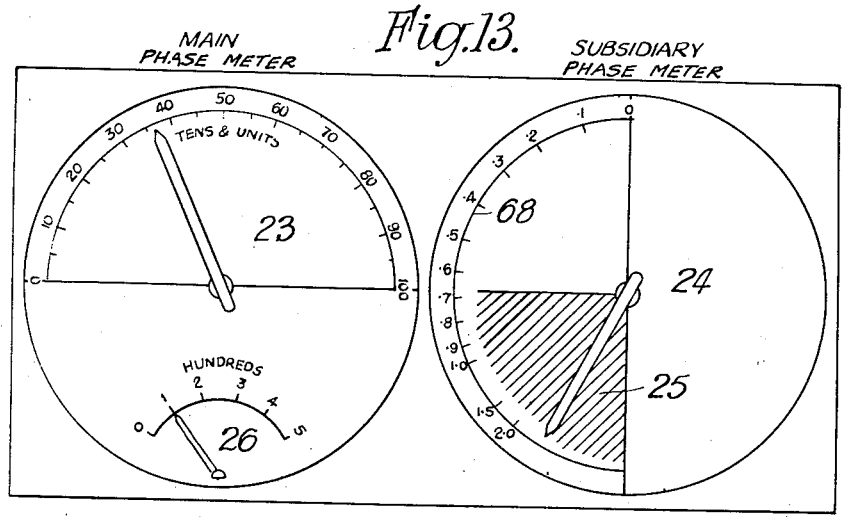
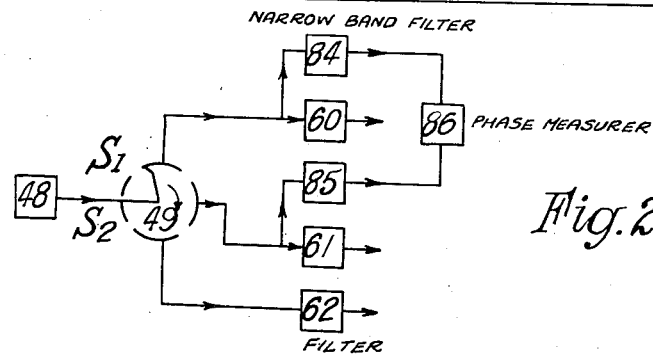
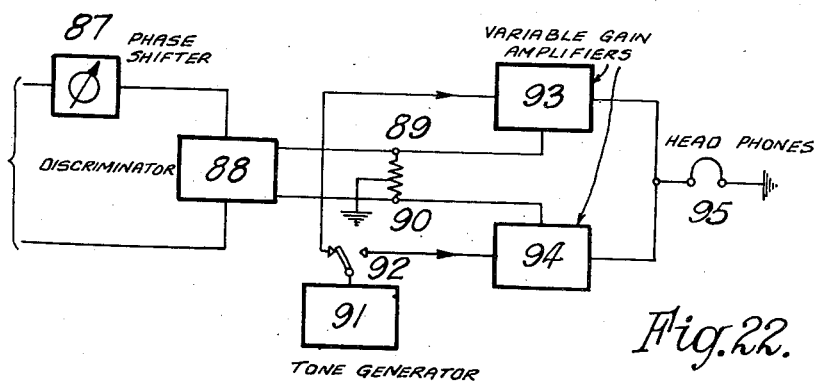

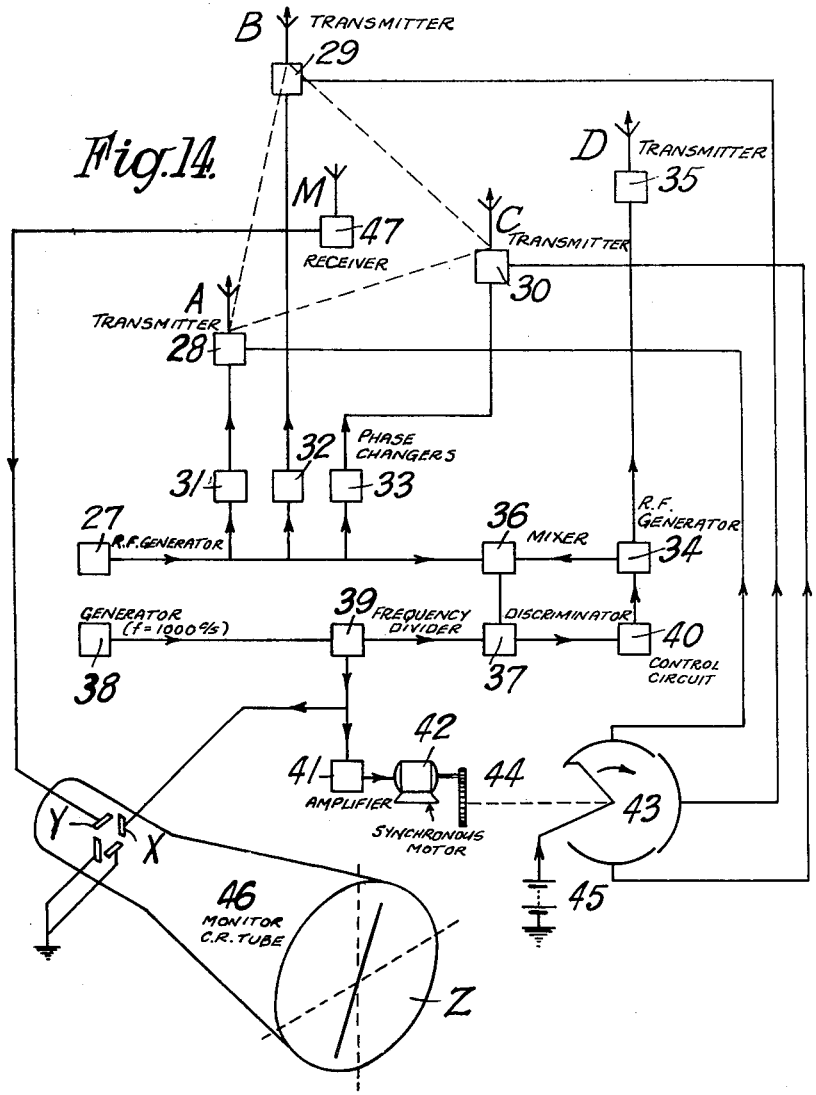

April 4, 1950  H. T. MITCHELL ET AL  2,502,662
RADIO BEACON SYSTEM
Filed July 2, 1947  6 Sheets-Sheet 5

INVENTORS—
Henry Thomas Mitchell and Thomas Kilvington
BY: John H. Graham
THEIR AGENT.

April 4, 1950    H. T. MITCHELL ET AL    2,502,662
RADIO BEACON SYSTEM
Filed July 2, 1947    6 Sheets-Sheet 6

INVENTORS
Henry Thomas Mitchell
and Thomas Kilvington.
BY: John Graham
THEIR AGENT.

Patented Apr. 4, 1950

2,502,662

UNITED STATES PATENT OFFICE 2,502,662

RADIO BEACON SYSTEM

Henry Thomas Mitchell, South Ruislip, and
Thomas Kilvington, Wembley, England

Application July 2, 1947, Serial No. 758,526
In Great Britain March 1, 1944

Section 1, Public Law 690, August 8, 1946
Patent expires March 1, 1964

23 Claims. (Cl. 343—105)

This invention relates to radio beacons or navigational aids for ships, vehicles and aircraft.

The main object of the invention is to provide an improved system of radio beacon or navigational aid of the type which relies upon the determination of the difference of times of arrival at a receiving station of wave energies or signals transmitted from separated points or spaced radiators at a beacon station; the improved beacon system utilizes continuous waves, but whereas known systems of the type mentioned, operating with continuous waves, have required at least two frequency allocations and special dual or multiple receivers, the improved radio-beacon system offers the distinctive advantages that only one frequency allocation is necessary and that a normal receiver may be used for receiving the wave energies or signals from two or more radiators at the beacon station.

A further object of the invention is to provide an improved radio beacon system in which wave energies or signals are transmitted as continuous waves on a single frequency and in known phase-relation, the phase-difference at the transmitting or beacon station being fixed or variable at will, and the modified phase-difference at the receiving station being measured in order to find the position-line of the station by the determination of the difference of their transit times, that is the difference between the times taken by the respective wave energies or signals in travelling from the transmitting aerials or radiators to the receiving aerial.

Another object of the invention is to provide an improved radio-beacon system of the type mentioned in which the wave energies or signals are transmitted as continuous waves, on a single frequency and in known phase-relation, alternately or in regular sequence from the spaced radiators at the beacon station, with suitable distinguishing marks or indicia whereby they can be identified at the receiving station.

Another object of the invention is to provide an improved radio beacon system of the type mentioned, in which the phase-difference of the wave energies or signals transmitted as continuous waves, on a single frequency and in known phase-relation, is measured at the receiving station at a lower frequency obtained by heterodyning with a beating oscillator signal, this beating oscillator signal being most conveniently provided by another radiator in the same vicinity as the main ones but on a frequency differing for example by 50 to 100 cycles per second from the main radiating frequency.

Other objects and advantages of the invention will hereinafter appear from the following description, given with reference to the accompanying diagrammatic drawings, in which—

Figure 1 represents the positions of a two-element beacon or radiating station and a receiving station.

Figure 2 represents one type of transmitted signal.

Figure 3 represents a commutator device for switching the received signals.

Figure 4 represents one type of apparatus for measuring the phase-difference of the received signals.

Figure 5 represents one application of a cathode-ray tube for the same purpose.

Figure 6 represents the phase-difference pattern around a two-element beacon station with a radiator-spacing of half a wavelength.

Figures 7, 8 and 9 represent three forms of beacon stations, each with three radiating elements at separated points.

Figure 10 represents an electronic switching device for separating the received signals.

Figure 11 represents the phase-difference pattern around a two-element beacon station with a radiator-spacing of one wavelength.

Figure 12 represents in a different form the phase-difference pattern around a three-element beacon station with a radiator-spacing of half a wavelength.

Figure 13 represents the lay-out of receiving instrument scales for general navigation by the aid of a three-element beacon.

Figure 14 represents the preferred arrangement of the beacon station.

Figure 21 represents part of the measuring equipment represented in Figure 15, as modified for indicating the distance along the glide-path.

Figure 22 represents apparatus for the aural indication of a course from the phase-difference measurements.

Figure 15:
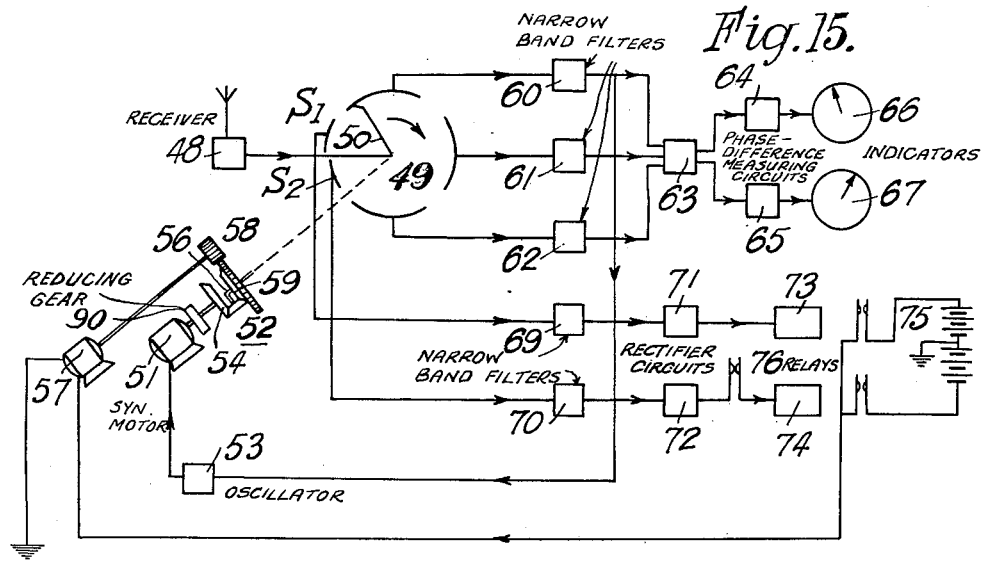
Figure 15 represents the measuring equipment of a mobile receiving station.

Referring to Figure 1 of the drawings, let the same radio frequency $f_1$ be transmitted simultaneously and in phase from two radiators situated at A and B and having a spacing $2s$. Then the two signals received at a point P in the field of the two radiators will have a phase-difference $2s.\cos\theta/\lambda$, where $\lambda$ is the wavelength of the radiated signal and $\theta$ is the angle between the line AB and the line joining P to D, the mid-point of AB, provided that the distance PD is large compared with the line AB. It can be shown that if PD is more than eleven times AB, the theoretical phase-difference at P will not vary from that computed by the above formula by more than 0.1%. Furthermore, outside this range the hyperbolic loci of points of constant phase-difference will be very nearly straight lines radiating from the point D.

Now if the signals are transmitted simultaneously from the points A and B, it is apparent that it would be difficult to measure the phase-difference of the signals received at P. To overcome this difficulty, the radiator at B can be rendered inoperative while the radiator at A is radiating, and vice versa. If such an arrangement is adopted, the A and B signals must be marked in some way so that they can be distinguished from one another. This may be accomplished by making the signals radiated from A and B of different lengths; for example the A signal might be twice as long as the B signal. Alternatively both radiators may be rendered inoperative for a period, resulting in the type of signal shown in Figure 2 consisting of a dash from A and a dash from B followed by a space S, the complete sequence being repeated indefinitely at any desire repetition rate. Then the A dash is known to be always the one following the space and the B dash is known to be the one preceding the space.

The signals received at the point P will consist of interlocked dashes of radio frequency as described above. It will however, usually be more convenient to make the desired phase-measurement at much lower frequencies than that used for radiation. The radio frequency dashes may therefore be converted to dashes of a lower frequency by mixing them with a suitable signal derived from a beating oscillator and extracting the difference frequency. It is well known that the same phase-difference will be preserved between the dashes so produced as existed between the received radio frequency dashes. A variety of methods of measuring the phase-difference are available but almost all require that the frequency at which the measurement is made shall remain very constant. This means that the beating oscillator used in the manner described above must remain extremely stable particularly if the difference frequency is small. For a difference frequency in the audio-range for instance, the required beating oscillator would normally be too elaborate for incorporation in mobile equipment.

An alternative method of introducing the required beating frequency is to transmit the frequency $f_1+f_2$ (or $f_1-f_2$) continuously from a third radiator in the vicinity of the radiators A and B, the difference frequency $f_2$ being maintained rigidly at the desired value. The receiver will then pick up this signal as well as the working signal, provided that both fall within its pass-band, and mixing will take place in the detector. The result is that the output of the set will consist of dashes of the difference frequency $f_2$. Since in this case the beating oscillator is at the same site as the beacon transmitter, and since only one beating oscillator is required for any number of mobile receiving sets, elaborate precautions can be taken to keep the difference frequency $f_2$ at a stable value. By making this frequency $f_2$ within the audio range an ordinary receiver may be used for receiving the beacon signal, while if $f_2$ is made low within the audio range—for example below 100 cycles per second—then additional intelligence can be transmitted without interfering with the beacon signal, by using the beating oscillator frequency as carrier for speech or for tone telegraph signals, provided that modulation frequencies below 100 cycles per second are not used.

The output of the receiver will now consist of a signal similar to that shown in Figure 2 but consisting of low-frequency ($f_2$) dashes instead of carrier-frequency ($f_1$) dashes. The A and B dashes may be separated by means of electronic switches or a motor-driven commutator, as shown in Figure 3, the speed and phase of its switching being controlled in a manner to be presently described. Each train of dashes after separation may be considered as a low carrier-frequency ($f_2$) fully modulated by a rectangular wave. Such a signal consists of a carrier plus sidebands and if it is passed through a suitable narrow-band filter the continuous carrier may be extracted and the sidebands rejected. In this way the two separate intermittent trains of dashes may be converted into continuous signals for use with certain methods of phase-measurement.

The frequency of the rectangular modulating waveform may conveniently be a subharmonic of the frequency $f_2$; suppose it is $f_2/n$ where $n$ is an integer. Then suppose that one of the continuous-tone signals derived in the manner described is amplified and used to drive a synchronous motor having $n$ pairs of poles. Then its armature will rotate at frequency $f_2/n$ and may be used directly to drive the commutator shown in Figure 3. Since it has bee presupposed that the commutator is running in order to derive the continuous tone from the incoming signal it is clear that some special arrangement must be made for starting up the motor. This may be done by using an oscillator to drive the motor. As soon as the motor is started a continuous tone derived from the incoming signal will be available and this may be used to synchronise the oscillator which will thus drive the motor at the desired speed.

Consideration of Figure 3 will make it clear that not only must the commutator rotate at the correct speed but it must also rotate in the correct phase. Thus the contact to the A channel must be made only when the A dash is being received and the contact to the B channel only when the B dash is being received. The switching phase may be checked by examining the signal obtained on the third commutator segment S. This is arranged so that if the switching phase is correct the contact to it will only be made during the space in the beacon transmission. A meter or pair of telephones may be used to test the output from this segment and this indicating device will show zero output if the switching phase is correct. The phasing may be adjusted by rotating the commutator segments relatively to the body of the motor, or by removing the lock on the motor-driving oscillator. In the latter case the oscillator will run freely at a slightly different speed. This will cause the switching phase to change and the lock may be reapplied when it is correct. In order to provide some tolerance in the phasing of the commutator the A and B contacts are designed to close for periods rather shorter than the duration of the corresponding transmitted dashes. In this way the beginning and end of each dash, which may be distorted by the transient response of the receiver circuits, are discarded; it may be further arranged that the segments pass a complete number of half cycles of the tone in each dash, to the respective channels. This last condition ensures that there shall be no phase-difference between the tone in each dash and the continuous tone derived from the narrow-band filter apart from the constant phase-shift introduced by the filter itself.

Automatic phasing of the commutator may be arranged by splitting the commutator segment S into two parts $S_1$ and $S_2$, as described later with reference to Figures 15 and 16. In correct adjustment no signal will appear on either part. If the switching phase now drifts in one direction the signal will appear first on $S_1$ while if it drifts in the other direction the signal will appear first on $S_2$. By means of electronic or electromagnetic relays the presence of signal on either of these segments can be made to remove the lock from the motor-driving oscillator and cause it to change its frequency in such a way as to correct the drift of the switching phase.

Alternatively, static relays or electronic switching circuits may be used in the manner shown in Figure 10. The output from the receiver 11 is fed to three switching circuits 12, 13, and 14, normally biassed to cut-off. These may be electronic valves rendered operative in the desired sequence by square-wave signals derived from the switching square-wave generator 15 incorporating a subharmonic generator and driven from the oscillator 16 of frequency $f_2$. The outputs of the switching circuits 12, 13, and 14 are fed to the narrow-band-pass filters 17, 18, and 19 respectively. Filters 17 and 18 provide steady tones for the phase-measuring circuit 20 while the output from filter 19 is used to indicate correct phasing of the switching sequence by absence of signal on the meter 21. An output from filter 17 is additionally fed to the oscillator 16 in order to synchronise it at the correct frequency $f_2$.

The actual phase-measurement may be made in a number of ways. For instance the two continuous waves derived from the received trains of dashes in the manner previously described, if of sufficiently low frequency, may be applied directly to a phasemeter of conventional type. An electronic type of phasemeter with a D. C. indicating instrument may be used to cover frefrequencies up to a much higher range. Alternatively, one of the signals may be passed through a calibrated phase-changer as shown in Figure 4. The two signals are then applied to a phase-discriminator and null indicator. With a null indication the phase-difference between the original signals can be read off from the calibration of the phase-changer. A center-zero dynamometer instrument can be used as a combined phase-discriminator and null indicator.

A cathode-ray tube may be used in a variety of ways for measuring the phase-difference. The circuit of Figure 5 shows one method. A stable oscillator G provides a time base of frequency $f_2$ which is applied to the X plates of a cathode-ray tube CR through an uncalibrated phase-changer PC1. The received signal may be applied directly to the Y plates of the cathode-ray tube or through a calibrated phase-changer PC2 by throwing the key K. With the key in the position for direct application, the phasechanger PC1 is first adjusted so that the A dashes give rise to a straight line on the screen, the B dashes being neglected. The key is then thrown to the other position and the phase-changer PC2 is adjusted so that the B dashes give rise to a similar straight line, the A dashes now being neglected. The phase-difference between the A and B dashes may now be read off from the calibration of the phase-changer PC2. If desired the manually operated key may be replaced by a synchronised commutator as previously described so that the A dashes are automatically applied directly to the Y plates while the B dashes are passed through the phase-changer. The time-base may be rendered very stable by synchronisation from the received signal.

Alternatively the A or B trains of dashes or both may be passed through narrow-band filters and the continuous tones so derived may be applied to the X and Y plates of a cathode-ray tube. The phase-difference may then be estimated by measurement of the ellipse produced on the screen or by inserting a calibrated phasechanger in one side and adjusting it so that a standard pattern—for example a straight line— is produced on the screen. In the latter case the calibration of the phase-changer gives the phase-difference directly.

Alternatively, equipment of the type used for measuring the difference of the transit times of pulses may be used, the dashes of tone first being converted into pulses whose position in time depends on the phase of the tone producing them. To do this, the dashes of tone may first be converted to dashes of square-wave tone from which the required pulses can be obtained by means of a differentiating circuit. If the pulses derived from the A and B dashes are applied to a synchronised linear time-phase, the pulses will appear at two points on the screen depending on the phase-difference between the A and B signals. This phase-difference can then be estimated by measurement of the picture on the screen. A circular time-base with radial deflection or spot-modulation may be used as an alternative to the linear time-base. In any of these ways the technique of pulse measurements can be applied without the necessity for a very wide transmission-band width.

The technique for transmission and measurement having been described, the practical application of the system to navigation may be considered.

Inspection of Figure 6 which shows the phase-difference pattern with a radiator spacing of half a wavelength, shows that the pattern on one side of the line containing the two radiators is the exact mirror image of the pattern on the other side, although the pattern on either side contains no ambiguity. If the spacing is increased beyond half a wavelength the mirror-image ambiguity remains and additional ambiguity is introduced in each half of the pattern. But the accuracy with which a position-line may be found for a given accuracy of phase-measurement is increased since the phase-difference is proportional to the radiator spacing divided by the wavelength.

Figure 11 shows for example the effect of increasing the separation of the radiators to one wavelength; it will be seen that the pattern remains "mirror-imaged" about the line joining the radiators A and B, that ambiguity is caused in each half of the pattern, and that (as in the case of radiators spaced at half a wavelength apart) the lines are more closely grouped together near the perpendicular bisector of the line joining the radiators, hence giving greater discrimination in this direction. If the radiator-spacing is further increased to two wavelengths, ambiguity will arise in each quadrant of the pattern, but even greater discrimination will be given in the direction of the perpendicular bisector. Since ambiguity of reading can be eliminated by a fore-knowledge of the approximate position-line, by other navigational aids, or by wireless direction-finding in the normal manner on the same beacon-signals, the increased accuracy obtainable by wider spacing of the radiators will prove advantageous in many cases.

Various forms of three-element beacon may be used as aids to navigation. These are similar to the two-element beacon already described, with the addition of a dash from a third radiator C between the B dash and the space. The signals received may be separated into three channels A, B and C in the manner previously described, the three phase-differences (A—B, B—C, C—A) being measured successively. Alternatively, two phase-measuring circuits may be provided so that two of the phase-differences can be measured simultaneously.

One form of three-element beacon, illustrated in Figure 7, may be used where the highest possible accuracy at long distances from the beacon is required, but mirror-image ambiguity is not important, as for example in the case of transoceanic navigation. To obtain this accuracy the radiators A and C are spaced a number of wavelengths apart. A measurement on this pair will thus give an accurate but ambiguous position-line. The ambiguity can be eliminated by taking a second measurement on the pair of radiators A and B which are spaced not more than half a wavelength apart, so that alone they give an inaccurate position-line, non-ambiguous except for the mirror-image ambiguity which by assumption can be neglected.

Figure 8 shows a second type of three-element beacon which may be used for all-round general-purpose navigation without ambiguity. In this the three radiators A, B and C are placed at the corners of an equilateral triangle the length of whose side is half a wavelength. If the perpendicular bisector of the line joining a pair of radiators is called the normal for that pair, it will be apparent that a receiver situated anywhere around the beacon will be within +30° of the normal to one pair of radiators. As shown in Figure 6, this is the region of greatest discrimination, and over the sector within +30° of the normal, the phase-difference changes over a range of 180°; that is from —90° through zero on the normal, to +90°. Suppose a craft is at some unknown point. Then the various possible phase-differences (A—B, B—C, C—A) should be measured in turn, until the one is found which gives a phase-difference reading in the range —90° through zero to +90°. Suppose this happens to be the A—B pair. This means that the receiver must lie within one of the sectors 1 or 4. Which of these sectors is the correct one may be determined by the phase-difference measured on a second pair—say the B—C pair. Then if the receiver is in the sector 1 the B—C reading will lie between —90° and —180° while if it is in the sector 4 the B—C reading will lie between +90° and +180°.

As can be seen more clearly in Figure 12, any point upon an arbitrary course or position-line numbered from 0 to 600 around the beacon station will lie within a sector +30° from the perpendicular bisector of the line joining the two radiators of one pair, A and B, B and C or C and A. The beacon can therefore be regarded as a combination of three two-element beacons, and by suitably selecting the pair on which to work for a given position, an area of maximum discrimination (i. e. the sector within +30° of the normal) can always be used; the selection may be made by means of a six-position switch (not shown), each position of the switch corresponding to one of the +30° sectors, i. e. to 100 of the arbitrary position-line numbers marked in Figure 12. Two phase-difference measuring circuits are employed, a main circuit giving an accurate but ambiguous reading, and a subsidiary circuit to eliminate the ambiguity; in any position of the switch one pair of radiators will be selected for the main measuring circuit, which uses an area of maximum discrimination, the corresponding sectors being marked with double outlines and their courses of zero-phase difference being shown by the dotted lines 22, while at the same time a predetermined selection of another pair of radiators will be made for the subsidiary circuit, the respective measurements being indicated upon main and subsidiary meters combined in an instrument such as that represented in Figure 13.

In this instrument, the main meter 23, of which only the upper half (or first and fourth quadrants) will be used, is calibrated in tens from 0 (for —90° phase-difference) to 100 (for +90° phase-difference), with subdivisions to facilitate the reading of units; the subsidiary meter 24, of which only the third quadrant will be used, need not have a calibrated scale, but is distinctively marked in this quadrant, as indicated by cross-hatching at 25. In the lower half of the main meter, there is mounted an auxiliary meter 26, with a scale marked from 0 to 5, which merely indicates the position of the selector switch.

The method of using this three-element beacon system is as follows: The three radiators A, B and C are made to transmit dashes of the carrier frequency $f_1$, all of the same phase and in the order stated, followed by a spacing interval, while a continuous heterodyne signal is transmitted from a fourth radiator in the same vicinity on the frequency $f_1+f_2$ or $f_1-f_2$. In the receiving equipment, the A, B and C dashes may be separated by a commutator comprising four segments, through which circuits are closed in phase with the three signals and the spacing interval respectively, but the selection of the outputs to be led to the phase-meters 23 and 24 will be effected by the setting of the selector switch, in accordance with the following table:

| Switch Position | Sector | Main Meter | Subsidiary Meter |
| --- | --- | --- | --- |
| 0 | 0-100 | A—B | B—C |
| 1 | 100-200 | A—C | B—A |
| 2 | 200-300 | B—C | C—A |
| 3 | 300-400 | B—A | C—B |
| 4 | 400-500 | C—A | A—B |
| 5 | 500-600 | C—B | A—C | wherein A—B represents the the phase-difference between the A and B dashes, B—C represents the phase-difference between the B and C dashes, and so on, the first-mentioned dash being taken as the reference and angles of lead being regarded as positive.

Consider now how the phase-meters will read for a receiving station in the sector 0—100 for the various switch positions in turn; the following table shows the quadrants of the main and subsidiary meters 23 and 24 in which the readings will lie:

| Switch Position | Main Meter | Subsidiary Meter |
|---|---|---|
| 0 | 4 or 1 | 3 |
| 1 | 3 | 1 or 4 |
| 2 | 3 | 2 |
| 3 | 1 or 4 | 2 |
| 4 | 2 | 4 or 1 |
| 5 | 2 | 3 |

It will be seen that there are only two switch-positions (0 and 3) for which the main meter reading will lie in the first or fourth quadrants, the other four positions being therefore excluded; for only one (0) of these two positions will the subsidiary meter reading lie in the third quadrant, the other position (3) being therefore also excluded. Consequently the first switch-position (0) is the only one to be taken into account for a receiving station in the sector 0–100, the arbitrary position-line number being that actually shown on the main meter scale, between the points 0 and 100 marked thereon.

If the receiver is located in an unknown sector, the procedure is as follows: Turn the selector switch until the position is found which gives a reading in the calibrated half (first or fourth quadrant) of the main meter 23, and within the third quadrant of the subsidiary meter 24. Read off the figure on the auxiliary meter 26, as hundreds, followed by the main phase-meter reading, as tens and units, making up a number lying between 0 and 600; this will be the number of the radial line or arbitrary course indicated by the outermost scale in Figure 12. By making the scale of the main phase-meter 23 slightly non-linear, it is possible to arrange for equal spacing of the 600 radial lines, which would be marked upon a chart for use with this type of beacon.

For aircraft operating above the beacon, an additional scale may be provided on the subsidiary meter 24, as shown at 68 in Figure 13; this scale can be used when flying on any one of the courses marked 22 in Figure 12, to give the horizontal distance away from the beacon in terms of the height of the receiving point above the level of the three radiators, the units marked on the scale representing miles at an altitude of 5000 feet, for example.

Figure 14 represents the block schematic arrangement of a complete three-element beacon transmitter system in which the same carrier-frequency is used for transmitting interlocking dashes as continuous-wave signals from three separated radiators in regular sequence and a beating oscillator frequency is transmitted from a fourth radiator in the same vicinity.

A radio-frequency generator 27, consisting of a crystal-controlled oscillator, with frequency-multiplying stages if necessary, feeds three transmitters 28, 29 and 30 by way of phase-changers 31, 32 and 33, each of which has a range of 360° of phase at the transmitted frequency. The three radiators A, B and C, respectively energized by the transmitters 28, 29 and 30, are spaced from each other in the horizontal plane by distances equal to half a wavelength at the transmitted frequency. A second radio-frequency generator 34 generates a frequency as near as possible 83⅓ cycles per second higher than that of the generator 27, and feeds a fourth transmiter 35 energizing another radiator D in the same vicinity. A small leak from the output of each of the generators 27 and 34 is fed to a mixer circuit 36, from which the difference-frequency is extracted to feed a discriminator circuit 37 (see Tucker, The Synchronization of Oscillators, Electronic Engineering, June 1943, page 29, Figure 8). A stable source 38, of frequency 1000 cycles per second, feeds a 12:1 frequency-divider 39 yielding an output at 83⅓ cycles per second, which also is fed to the discriminator 37. The latter is of a compound type which gives a characteristic output when the two inputs are of different frequency or of the same frequency but deviating from a given phase-difference. This output is used to control the frequency of the generator 34 by way of a control circuit 40 (see Terman, Radio Engineer's Handbook, 1st Edition, page 654, Figure 22 (c)) in such a way that the frequency-difference between the signals from the generators 27 and 34 is rigidly locked to the same frequency as that derived from the divider 39. A second output from the divider is amplified by the amplifier 41 and used to drive a synchronous motor 42, which is coupled to a commutator 43 by means of a reducing gear 44 so that the commutator is driven at a speed of 333⅓ revolutions per minute.

The transmitters 28, 29 and 30 are normally biassed to cut-off, but are rendered operative in sequence by positive bias from a source 45 switched to them in turn by the commutator 43, each transmitter being operative for a time corresponding to the rotation of the commutator arm through 96° of arc with a gap corresponding to 72° of arc at the end of each sequence. A third output from the divider 39 is fed to the horizontal deflection plates X of a monitoring cathode-ray tube 46. A receiver 47, with its aerial M situated accurately at the center of the equilateral triangle formed by the radiators A, B and C, feeds the received and rectified signals from the beacon (consisting of dashes of tone at 83⅓ cycles per second) to the vertical deflection plates Y of the cathode-ray tube 46. In operation, the phases of the signals from the three radiators A, B and C are adjusted by means of the phase-changers 31, 32 and 33 respectively so that the picture produced on the screen Z of the cathode-ray tube 46 is a straight line sloping in the same direction in each case.

Any suitable type of receiver can be used for picking up the transmission, and the phase-measuring equipment provided after the receiver can be of various forms; since the radiating elements are relatively close together, compared with the distance at which reception takes place, the levels of reception from the individual radiators will be equal. The detected output is of a low frequency suitable for direct measurement of the phase-difference, so that no further change of frequency is necessary.

In the mobile measuring equipment represented also in block schematic arrangement in Figure 15, a receiver 48 of normal type tuned to the beacon signals has its output fed to a commutator 49 having its arm 50 driven by a synchronous motor 51 through a differential gear 52 at a speed of 333⅓ revolutions per minute. The synchronous motor 51 is driven by alternating current of 83⅓ cycles per second from the oscillator 53 and it preferably incorporates a reducing gear 90 to give the desired driving speed on the commutator, as an alternative to the use of a gearless motor having a larger number of pairs of poles. The drive from the synchronous motor 51 is applied to one crown-wheel 54 of the differential 52 while the commutator arm 50 is attached to the pinion-cage 56 of the differential. The timing of the commutator 49 can be changed by means of a small reversible direct-current motor 57 acting through a reducing gear 58 to drive the second crown-wheel 59 of the differential. When correctly timed, the commutator distributes the signals due to the transmitters 28, 29 and 30 (Figure 14) to the 83⅓-cycles-per-second narrow-band filters 60, 61 and 62 respectively. The continuous tones from these filters are fed to a switch unit 63 which enables any two pairs to be selected and passed to the phase-difference measuring circuits 64 and 65 and the phase-difference indicators 66 and 67. A leak from the output of the filter 60 is additionally fed to the oscillator 53 in order to synchronize it at the same frequency as is derived from the divider 39 in the transmitting equipment, thereby controlling the speed of rotation of the commutator arm 50 at the same value as that of the transmitting commutator 43. The outputs of the two small segments S1 and S2 of the commutator 49 are also fed through 83⅓-cycles-per-second narrow-band filters 69 and 70 and by way of rectifying circuits 71 and 72 to two relays 73 and 74 respectively.

If the timing of the commutator 49 is correct, its arm 50 will rotate in step with that of the transmitting commutator 43, so that contact with the two small segments S1 and S2 will be made only during the gaps in the transmission from the radiators A, B and C; consequently no signal will be passed on from the two small segments and the relays 73 and 74 will remain inoperative. If, on the other hand, the commutator arm 50 gets out of step with the commutator 43, a signal will appear on one or other of the two small segments, causing one of the relays 73 and 74 to operate; this starts up the motor 57 in the proper direction to correct the timing, as determined by whichever relay operates, the direct current being derived from a suitable source 75 by way of the appropriate relay contact. An additional break contact 76 operated by the relay 73 prevents both relays from being in operation at the same time, as might otherwise occur if the timing of the commutator were so far out that signals appeared on both of the small phasing segments of the commutator 49.

Figure 16:
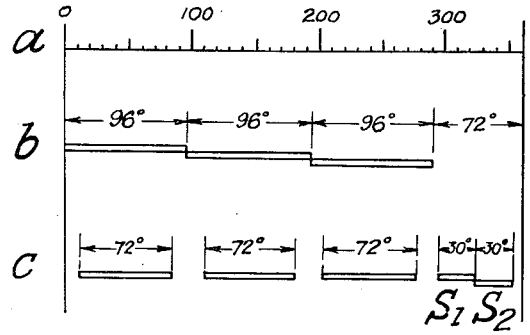
Figure 16 represents the arrangement of the segments on the transmitting and receiving commutators.

In Figure 16, the top scale $a$ represents one complete revolution (0° to 360°) of the the transmitting commutator 43, the wiper arm being assumed to move from left to right at a uniform speed. The middle scale $b$ represents the lengths of the segments of the commutator 43, there being three segments of length 96°, followed by a gap of 72° to complete the revolution; the three segments are shown slightly out of line for the sake of clarity. The bottom scale $c$ represents the lengths of the segments on the receiving commutator 49, the three signal segments having lengths of 72° each with gaps of 24° between them, and the two small phasing segments S1 and S2 having lengths of 30° each with no gap between them but with gaps of 18° between their remote ends and the adjacent signal segments. When correctly timed, the receiving commutator picks out the center portion (72°) of each transmitted signal or dash (96°); the fact that the receiving commutator segments are shorter than the corresponding segments of the transmitting commutator allows a little tolerance in the timing of the receiving commutator.

A third form of three-element beacon, illustrated in Figure 9, may be used to assist the blind landing of aircraft. The three radiators are placed at the corners of a right-angled triangle. The radiators A and B are situated on a line transverse to the direction of landing and provide lateral guidance. They are spaced up to about 11/12 of a wavelength apart so as to give maximum discrimination but only one zero phase-difference course which is the correct one for landing. The radiators A and C are situated on a line parallel to the direction of the runway and their space pattern is used to give vertical guidance to the landing aircraft. The pattern in the vertical plane in which the aircraft lands is the same as the pattern existing in the horizontal plane on either side of the line joining the transmitters. To give the same accuracy of guidance in the vertical direction for a glide path at 3° as is obtained in lateral guidance the spacing A—C must be nineteen times the spacing A—B.

Figure 17:
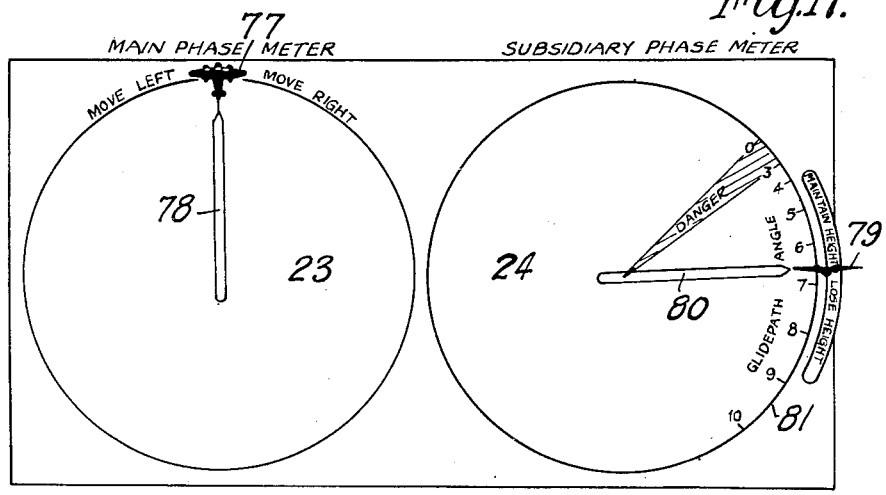
Figure 17 represents additional markings for the receiving instrument in the blind landing of aircraft by the aid of a three-element beacon.

With any system of blind landing, the information derived from the radio aid must be displayed to the pilot or navigator in a manner which requires the least possible mental effort on his part to convert it into the physical action needed. As has previously been stated, the same equipment as is used for general navigation with the three-element beacon may be used for blind landing; certain additional markings on the phase-meters will however be desirable, for example as represented in Figure 17. Here an aircraft silhouette 77 is added to the center reading of the main meter 23 and the correct path of approach is indicated by the pointer 78 being in line with the tail of the silhouette; a deflection of the pointer to the left will mean that the aircraft must be steered to the left, and vice versa. Similarly, a silhouette of an aircraft, in tail view, is provided at 79 on the subsidiary meter 24, a correct glide path being then indicated by the pointer 80 being in line with the wings of the silhouette; if the pointer is too low, it will mean that the aircraft must lose height, but if the pointer is too high, the aircraft should maintain height until the required pointer reading is obtained. This silhouette 79 should be adjustable over a sufficient range to enable the pilot to choose a glide path suitable for the prevailing weather conditions, the loading of the aircraft, and other circumstances; the desired glide path is chosen by reference to the scale 81 calibrated in angles of glide.

Figure 18:
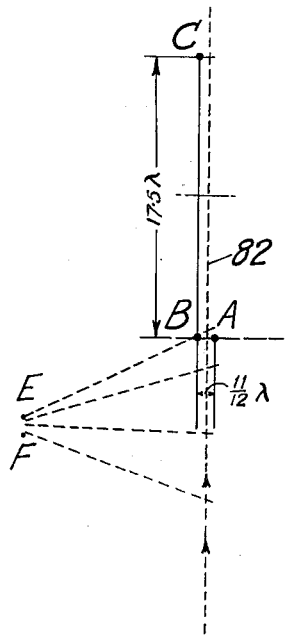
Figure 18 represents a three-element lay-out for a blind-landing beacon.

As has already been mentioned in connection with Figure 9, a particular form of three-element beacon may be used to assist the blind landing of aircraft. Figure 18 shows in greater detail the lay-out of this beacon with three transmitting aerials or radiators A, B and C; the pairs of aerials (A and B, B and C) behave as two two-element beacons, the former pair (A and B) being located on a line transverse to the landing track 82 and used for lateral guidance (runway location) and the latter pair (B and C) being located on a line parallel to the landing track and used for vertical guidance (glide-path).

Figure 19:
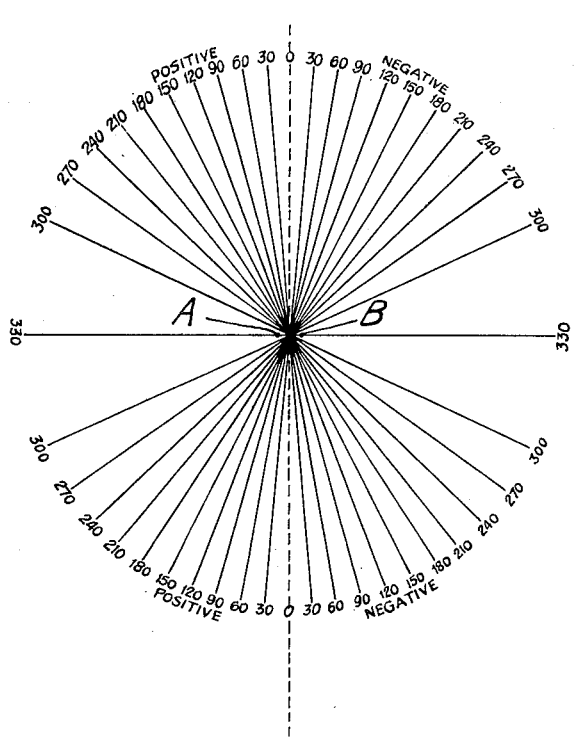
Figures 19 and 20 represent the phase-difference patterns of the blind-landing beacon in the horizontal and vertical planes respectively.

It is desirable that there should be no ambiguity of the lateral guidance path; if the aerials A and B radiate signals in phase, there will be only one path of zero phase-difference (viz. the perpendicular bisector of the line joining the aerials A and B), provided that the separation of these aerials is less than one wavelength. In practice, eleven-twelfths of a wavelength would be about the maximum tolerable spacing for the aerials, which would give a range of phase-difference variation in the field-pattern from −330° to +330°, as shown in Figure 19 of the accompanying drawings; assuming the accuracy of the phase-difference measurements to be within ±2°, it would then be possible to locate the runway direction to an accuracy of ±⅓°.

The phase-pattern of the aerials B and C in the vertical plane through them would be used for vertical guidance down a glide path; this phase-pattern is the same as that existing in the horizontal plane on either side of the line BC produced. For shallow angles of glide, with a minimum of 3° for example, the aircraft would approach on the part of the phase-pattern giving the lowest discrimination; in order to increase this discrimination to a practical value, the spacing of the aerials B and C may be increased to several wavelengths. Taking the phase-difference as $2s \cos \theta / \lambda$, it can be shown that with a 3° glide-path, if it is required to give the same degree of discrimination in the vertical direction as is obtainable in the lateral direction, the spacing (2s) must be increased in the ration sin 90°/sin 3°, or about nineteen times; this gives a value of the spacing for the aerials B and C of about 17½ wavelengths, as compared with the spacing of the aerials A and B at eleven-twelfths of a wavelength apart, the resulting phase-pattern in the vertical plane of the runway being represented in Figure 20. All the glide-paths are practically straight lines leading directly to the beacon station; in order to ensure that no damage shall be caused to or by the landing aircraft running into the aerials, the latter may be sunk in pits below ground level, the pits being covered by suitable material of low dielectric loss to allow the aircraft to pass over the pits, as suggested in the U. S. Bureau of Standards Journal of Research, vol. 19, page 1.

Since three transmitting aerials are used with this system of blind landing, the phase-measuring equipment described with reference to Figures 13 to 16 will be suitable; the selector-switch position 0 would display the lateral-guidance reading on the main phase-meter 23, the correct course being indicated by a center-scale reading, while the vertical guidance or glide-angle reading would be found on the subsidiary meter 24, a reading in the region marked with the blind-landing scale 81 being produced by suitable arrangement of the transmitted-phase relationship B—C.

Figure 20:
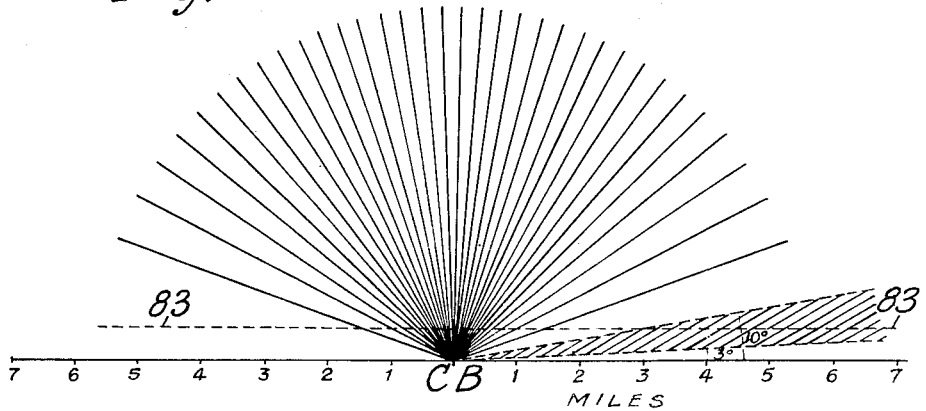

Owing to the large aerial-spacing for vertical guidance, a number of ambiguous glide-paths would be set up; for example, in the phase-pattern represented in Figure 20, each of the thirty-five sectors would cover phase-differences from 0° to 360°, so that the required reading could be obtained in any one of these sectors, giving thirty-five different glide-paths. But the pilot or navigator should have little difficulty in distinguishing the correct glide-path, since his approach at a height of 2500 feet (for example) along the horizontal dotted line 83 will cause the vertical-guidance phase-meter pointer 80 to rotate once from extreme range to within about 1½ miles of the beacon; if the aircraft has not then already started to lose height, the speed of rotation of the pointer will increase rapidly and within the next 3 miles it will make thirty-three revolutions, indicating a succession of spurious or phantom glide-paths which will be obviously too steep or even impossible to follow, the highest speed of rotation of the phase-meter pointer indicating when the aircraft is directly over the beacon.

The distance of the aircraft along the landing track or glide-path could be indicated to the pilot or navigator by the reading obtained from an additional two-element beacon comprising radiators E and F, situated to one side of the runway, as shown in Figure 18, for example about ¼ mile to right or left of the landing track, and giving a continuous distance-indication over a certain range. The working frequency for this additional two-element beacon can be made equal to the main beating oscillator frequency plus $f_3$, or to the main beating oscillator frequency minus $f_3$, where $f_3$ is a low audio-frequency differing from $f_2$. The same beating oscillator will then produce a distinctive beat note of frequency $f_3$ in the receiver appropriate to the additional two-element beacon. Furthermore if the E and F dashes are transmitted at the same times as the A and B dashes respectively, the same switching circuit may be used in the receiving equipment, as indicated in Figure 21, which shows a part of the main measuring equipment as illustrated in Figure 15 with the addition of two narrow-band filters 84 and 85 tuned to the frequency $f_3$ and connected in parallel with the main circuit filters 60 and 61 respectively. These filters 84 and 85 extract the frequency $f_3$ appropriate to the additional two-element beacon and pass it to an additional phase-measuring device 86.

Aural course-indication, for example of the equi-signal type, possesses an advantage in cases where the pilot of an aircraft is also acting as navigator; such an indication can readily be achieved with receiving equipment operating according to the present invention, a suitable arrangement being represented in Figure 22. The required course is chosen by setting the phase-shifter 87 in such a way that when the aircraft is flying on the correct course, the signals applied by the receiver (not shown) to the phase-discriminator 88 (see Bond, Radio Direction Finders, 1st edition, page 179, figure 6.09) will be 90° out of phase; the discriminator is of a type which gives equal direct-current voltages to earth from the points 89 and 90 when the signals applied are 90° out of phase, and these voltages are used to control the level of the respective audio-frequency tones, preferably dots and dashes, produced by the tone generator 91 and ticking relay contact or commutator 92 with variable-gain amplifiers 93 and 94. So long as the voltages remain equal, the levels of the dots and dashes will be equal, and since they are arranged to interlock, an equisignal indication will be given in the head-phones 95 or the like; on the other hand, deviation from the correct course will cause the signals applied to the discriminator 88 to differ in phase by more or by less than 90°, and the voltages at the points 89 and 90 will be different, which will make either the dots or the dashes predominate in the audio-signal, thereby indicating to the pilot the sense and degree of his deviation from true course.

In all forms of the improved radio aid or beacon system, the zero-phase-difference line may be swung away for coding or other purposes from the normal or perpendicular bisector of the line joining two radiators or aerials, by transmitting the signals at a suitable and fixed phase-difference, instead of transmitting the signals in phase as described above, this difference being taken into account in the design of the measuring equipment or known to the operator at the receiving station. Furthermore, there is no limit to the theoretical accuracy which may be obtained (with the introduction of ambiguity) by increasing the radiator spacing or separation; as compared with the distance to the receiving point, the radiators will in all cases be geographically so close together that the family of hyperbolae representing the position-lines can be considered as a system of straight lines radiating from the point midway between the two radiators, without any appreciable loss of accuracy.

What we claim is:

1. In a radio beacon system, means for radiating continuous wave energies on a single frequency from a plurality of spaced radiators, said energies having a known phase-relation, said energies being radiated in turn with indicia for their respective identification, and means located at a receiving station for measuring the phase-difference of said energies as received at said station.

2. In a radio beacon system, means for radiating continuous wave energies on a single frequency from a plurality of spaced radiators in turn with at least one regular distinguishing interval for their respective identification, and means located at a receiving station for measuring the phase-difference of said energies as received at said station.

3. In a radio beacon system, means for radiating continuous wave energies on a single frequency from a plurality of spaced radiators, said energies being radiated with a definite phase-relation, means for producing a beating oscillator signal for heterodyning said energies, and means located at a distant receiving station for measuring the phase-difference of the low-frequency beat-notes.

4. In a radio beacon system, means for radiating continuous wave energies on a single frequency from a plurality of spaced radiators, said energies being radiated with a definite phase-relation, means located in the vicinity of said radiating means for producing a beating oscillator signal for heterodyning said energies, and means located at a distant station for receiving said heterodyned wave energies and measuring their phase-difference as received at said distant station.

5. In a radio beacon system, means for radiating continuous wave energies on a single frequency from a plurality of spaced radiators in turn, said energies having a definite phase-relation, a switching device located at a receiving station for separating the wave energies, and means for measuring the phase-difference of the separated energies.

6. In a radio beacon system, means for radiating continuous wave energies on a single frequency from a plurality of spaced radiators in turn, said energies being radiated with a definite phase-relation, an electronic switching device located at a receiving station for separating said wave energies, and means for measuring the phase-difference of the separated energies.

7. In a radio beacon system, means for radiating continuous wave energies on a single frequency from a plurality of spaced radiators in turn, said energies being radiated with a definite phase-relation, a switching device located at a receiving station for separating said energies, said switching device including a commutator driven by a synchronous motor, and means for measuring the phase-difference of the separated energies.

8. In a radio beacon system, means for radiating continuous wave energies on a single frequency from a plurality of spaced radiators in turn, said energies being radiated with a definite phase-relation, means for producing a beating oscillator signal for heterodyning said energies, a switching device located at a receiving station for separating said heterodyned energies, said switching device including a commutator driven by a synchronous motor controlled by the beat frequency, and means for measuring the phase-difference of the heterodyned energies.

9. In a radio beacon system, means for radiating continuous wave energies on a single frequency from a plurality of spaced radiators, said energies being radiated with a definite phase-relation, an electronic switching device located at a receiving station for separating the wave energies, means for extracting continuous tones from the separated wave energies, said extracting means including narrow band pass filters, means for measuring the phase-difference of the tones extracted from two separated energies, and means controlled by the tones extracted from a third separated energy for indicating correct phasing of the switching sequence.

10. In a radio beacon system, means for radiating continuous wave energies on a single frequency from a plurality of spaced radiators, said energies being radiated at successive intervals of time and in definite phase-relation, a switching device located at a receiving station for separating the wave energies, said switching device including a motor driven commutator, said commutator having substantially equiangular spaced segments equal in number to the energies to be separated and an auxiliary segment interposed between two of the equiangular segments, said auxiliary segment being split into two adjacent parts insulated from one another, correcting means for changing the phase-relation of said commutator to the received energies to be separated, said correcting means being made operative by manifestation of a received wave energy on either part of said auxiliary segment, and means for measuring the phase-difference of the separated energies.

11. In a radio beacon system, means for radiating continuous wave energies on a single frequency from three separated radiators in turn, said energies differing in phase by known angular amounts, and means located at a receiving station for measuring the phase-difference of the energies from selected pairs of said radiators as received at said station.

12. In a radio beacon system, means for radiating continuous wave energies on a single frequency from three separated radiators in turn, said radiators being spaced at unequal distances apart, said energies differing in phase by known angular amounts, and means located at a distant receiving station for measuring the phase-difference of the energies from selected pairs of said radiators as received at said station, the measured phase-difference of the energies from a more closely spaced pair of said radiators serving to check any ambiguity of the position-line obtained by measurement of the phase-difference of the energies from a more widely spaced pair of said radiators.

13. In a radio beacon system, means for radiating continuous wave energies on a single frequency from three separated radiators in turn, said radiators being arranged at points arranged in a straight line, said energies differing in phase by known angles, and means located at a distant receiving station for measuring the phase-difference of the energies from selected pairs of said radiators as received at said station, the measured phase-difference of the energies from a more widely spaced pair of said radiators being utilized for greater accuracy of the position-line thereby obtained than that obtained by measurement of the phase-difference of the energies from a more closely spaced pair of said radiators, and any ambiguity of the first-mentioned position-line being eliminated by checking with that obtained by measurement of the phase-difference of the energies from the more closely spaced pair of said radiators.

14. In a radio beacon system, means for radiating continuous wave energies on a single frequency from three separated radiators in turn, said radiators being spaced at the corners of an equilateral triangle having sides of a length equivalent to half the wave length of said energies, said energies differing in phase by known angles, and means located at a distant receiving station for measuring the phase-difference of the energies from selected pairs of said radiators as received at said station, the measured phase-difference of the energies from one pair of said radiators giving an accurate but ambiguous position-line for a receiving station located within an area centered upon the perpendicular bisector of a line joining said pair of radiators, and the measured phase-difference of the energies from another pair of said radiators giving another result for eliminating the ambiguity of said position-line.

15. In a radio beacon system for aerial navigation, means for radiating continuous wave energies on a single frequency from three separated radiators in turn, said radiators being spaced at the corners of a triangle, said energies differing in phase by known angles, and means borne by an aircraft for measuring the phase-difference of the energies from selected pairs of said radiators, the measured phase-difference of the energies from one pair of said radiators giving lateral guidance for runway location by said aircraft when approaching in one angular relation to said triangle, and the measured phase-difference of the energies from another pair of said radiators giving vertical guidance of said aircraft upon a glide-path.

16. In a radio beacon system, means for radiating continuous wave energies on a single frequency from a plurality of spaced radiators in turn, said energies being radiated in definite phase-relation, means located in the vicinity of said radiators for radiating continuous wave energies on another frequency from a pair of other radiators, said other-frequency energies being radiated in definite phase-relation, and means located at a receiving station for measuring the phase-difference of selected pairs of said energies on a common frequency as received at said station.

17. In a radio beacon system, means for radiating continuous wave energies on a single frequency from a plurality of spaced radiators in turn, said energies being radiated in predetermined phase-relation, means for radiating other continuous wave energies on another frequency from a plurality of other spaced radiators in turn, said other energies being radiated in predetermined phase-relation, means for producing a beating oscillator signal for heterodyning said energies, and means located at a receiving station for measuring in turn the phase-difference of the respective wave-energies as heterodyned by said beating oscillator signal.

18. In a radio beacon system, means for radiating continuous wave energies on a single frequency from two spaced radiators, said energies being in predetermined phase-relation, a switching device located at a receiving station for separating the wave energies, means for shifting the phase of one separated energy to obtain a desired phase-relation of the separated energies, a phase-discriminator fed by the separated energies, means for generating audio-frequency tones of two different characters, and an aural indicator for said audio-frequency tones, said phase-discriminator controlling the respective levels of said audio-frequency tones in said indicator, and said audio-frequency tones producing an equisignal indication in said indicator so long as the phase-relation of the separated energies has the desired value predetermined by said phase-shifting means.

19. Radio navigation-aid system, consisting of a beacon station, said beacon station comprising a first radiator, means for transmitting a continuous wave radio signal from said first radiator upon a predetermined frequency, a second radiator spaced from said first radiator, and means for transmitting a continuous wave radio signal from said second radiator upon the same frequency as the signal transmitted from said first radiator and in a predetermined phase-relationship with respect to the signal transmitted by said first radiator, and a receiving station of which the position line is to be determined, said receiving station comprising a radio receiver for receiving the signals transmitted by said two radiators, and means for measuring the phase-difference between the signals received from said radiators.

20. Radio navigation-aid beacon station, comprising a plurality of spaced radiators, means for transmitting continuous wave signals from said radiators in turn upon a common predetermined frequency, another radiator in the vicinity of said first-mentioned radiators, and means for transmitting continuous wave signals from said other radiator upon another predetermined frequency differing from said common frequency, said other-frequency signals being adapted to heterodyne said common-frequency signals when received at a distant point for measurement of the phase-difference between two heterodyned signals as received at said distant point.

21. Radio navigation-aid receiver, comprising means for receiving a plurality of continuous wave signals transmitted from a plurality of spaced radiators at periodic successive time intervals on a common carrier frequency, means for separating the signals received from one of said radiators from the signals received from another of said radiators, and means for measuring the phase-difference between two separated signals.

22. In a radio beacon system, a method of finding the position line of a receiving station, which comprises the steps of producing at a distant transmitting station a plurality of continuous wave energies on a common frequency and in known phase relation, radiating said energies successively in turn from spaced radiators at said transmitting station with at least one regular interval for identification of the respective energies, measuring the phase-difference of said energies as received at said receiving station, and determining from the measured phase-difference at said receiving station the difference between the transit times of the respective energies from said transmitting station to said receiving station.

23. In a radio beacon system, a method of finding the position line of a receiving station, which comprises the steps of producing at a distant transmitting station a plurality of continuous wave energies on a common frequency and in known phase relation, radiating said energies successively in turn from spaced radiators at said transmitting station with at least one regular interval for identification of the respective energies, measuring the phase-difference of said energies as received at said receiving station, and determining from the measured phase-difference at said receiving station the difference between the transit times of the respective energies from said transmitting station to said receiving station.

HENRY THOMAS MITCHELL.
THOMAS KILVINGTON.

REFERENCES CITED

The following references are of record in the file of this patent:

UNITED STATES PATENTS

| Number | Name | Date |
| --- | --- | --- |
| 1,562,485 | Affel | Nov. 24, 1925 |
| 1,998,834 | Englund | Apr. 23, 1935 |
| 2,141,281 | Southworth | Dec. 27, 1938 |
| 2,400,232 | Hall | May 14, 1946 |
| 2,404,196 | Seeley | July 16, 1946 |
| 2,405,231 | Newhouse | Aug. 6, 1946 |
| 2,415,566 | Rea | Feb. 11, 1947 |
| 2,417,807 | Brunner | Mar. 25, 1947 |
| 2,430,244 | O'Brien | Nov. 4, 1947 |